INVENTOR
E. G. JAASMA
BY G. E. Hirsch Jr.
ATTORNEY 3,369,169

MICROWAVE FREQUENCY MULTIPLIER WITH A PLURALITY OF HARMONIC INHIBITING MEANS

Edward G. Jaasma, Paterson, N.J., assignor to Bell Telephone Laboratories, Incorporated, New York, N.Y., a corporation of New York Filed May 14, 1964, Ser. No. 367,347
9 Claims. (Cl. 321—69)

Figures 1, 2:
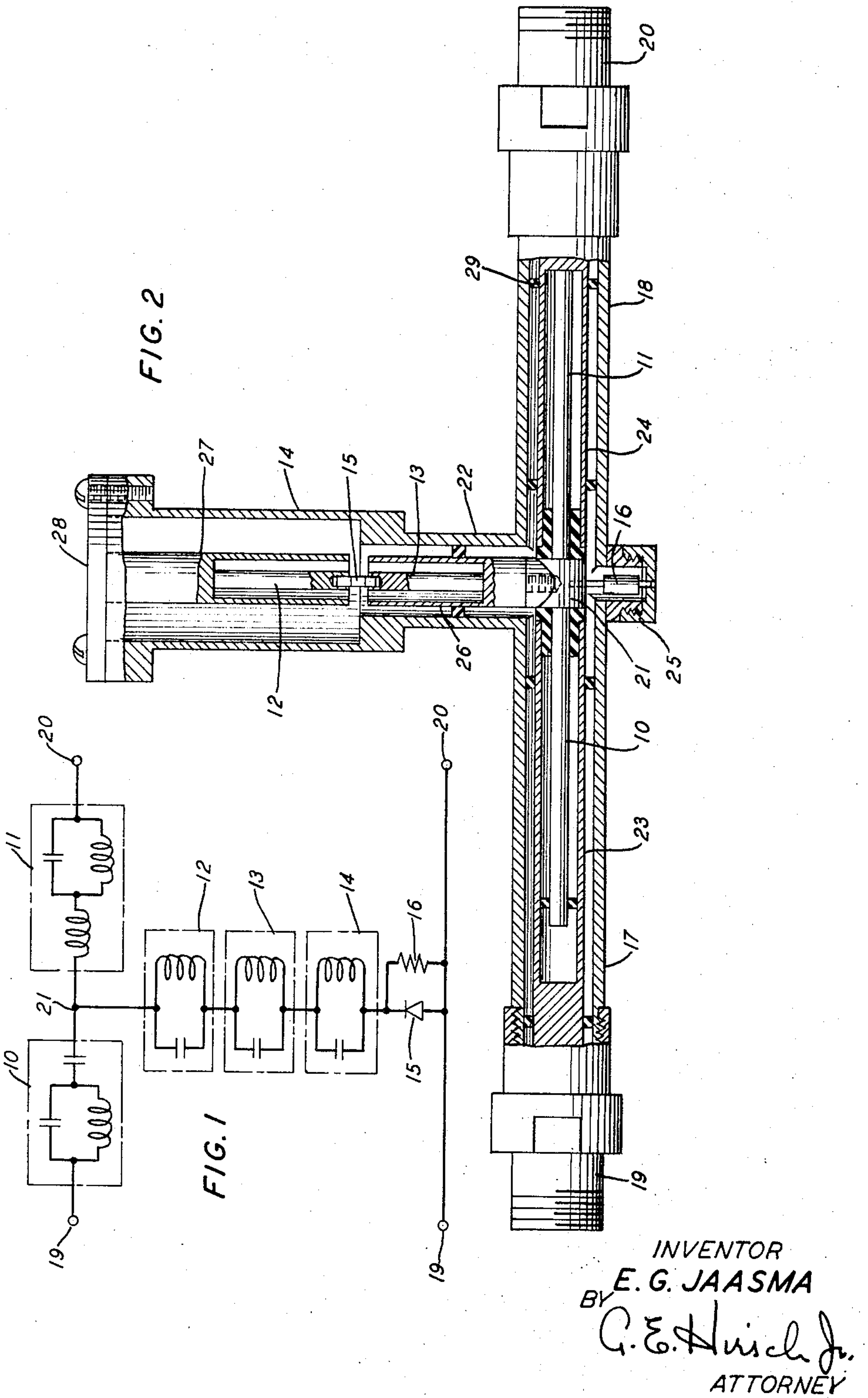

This invention pertains to generation of harmonic frequencies of an applied signal and, more particularly, to improved microwave frequency doubler apparatus.

The use of variable reactance devices to effect the conversion of an applied signal of one frequency to that of another is now well known in the art. Such devices, when energized by an incident signal of specified frequency, generate signal frequencies integrally related thereto. As is true of transmission systems, frequency conversion is accompanied by losses which must be minimized if efficient communication is to be accomplished. In a microwave frequency doubler circuit, substantial losses result if the input and output signal frequencies circulate, respectively, in the output and input circuits. In addition, impedance mismatches at the input and output terminals and the generation of unwanted higher order harmonics give rise to conversion efficiencies of such low magnitude that serious doubt is cast upon the feasibility of microwave frequency conversion.

Proposals of the prior art to mitigate these inherent deficiencies have primarily relied on apparatus external to the microwave multiplier circuit itself. For example, the elimination of unwanted higher order harmonics has been accomplished by using bandpass filters coupled to the output of the multiplier. The circulation of unwanted signal components in the load and input circuits and the resulting power losses arising therefrom is mitigated by the use of external microwave "isolators." In addition, external tuning apparatus, e.g., stub tuners, are used to match the reactive impedance of the active device to the source and load impedances. Two stub tuners must be used, requiring dependent tuning manipulations at both the input and output signal frequencies. The use of such external apparatus at the input and output ports of the multiplier apparatus gives rise to large standing waves interior to the multiplier. The presence of these standing waves increases the resistive and dielectric losses of the multiplier. Pragmatically, the utilization of external filters, isolators and tuners is both expensive and wasteful of space. In this age of satellites, compactness is not only desirable but also necessary.

It is, therefore, an object of this invention to provide an improved microwave frequency doubler.

Another object is to accomplish efficient frequency conversion without the use of external filtering apparatus.

Yet another object is to accomplish efficient frequency conversion without the use of external tuning apparatus.

These objects are accomplished, in accordance with the present invention, by utilizing a coaxial microwave structure incorporating a variable reactance device. Applied microwave signals of specified frequency, from any convenient source, are propagated in an input coaxial transmission line which includes, interior to its inner conductor, a quarter wave choke for inhibiting the propagation of a signal whose frequency is the second harmonic of the specified source frequency. An output coaxial transmission line, incorporating a quarter wave choke for inhibiting the propagation of the input signal is joined to the input line by a transversely connected coaxial transmission line. This line includes a quarter wave choke for inhibiting the propagation of a signal whose frequency is the fourth harmonic of the source frequency. A fourth coaxial transmission line, including a quarter wave choke for inhibiting the propagation of a signal whose frequency is the third harmonic of the input signal frequency, is coupled by a variable reactance device to the transverse coaxial line.

An applied signal is conveyed by the input line to the junction of the output and transverse lines. Prevented from entering the output line by the quarter wave choke, the input signal is conveyed to the reactance device. This device, excited by the incident field of specified frequency, generates harmonics thereof. The third and fourth harmonic signals are inhibited and the output second harmonic signal is conveyed to the junction of the input and output lines. The choke of the input line open circuits this line at the output signal frequency. The second harmonic signal is therefore conveyed by the output line to any suitable load.

The apparatus as described is capable of frequency conversion free of losses incurred from unwanted load and source circulating signals and unwanted higher order harmonics. Yet to be remedied are the losses resulting from an impedance mismatch of the reactive device and the load and source, respectively. By the practice of this invention, these losses are mitigated by proportioning and arranging the members of the apparatus in a novel fashion. In particular, they have electrical characteristics in accordance with formulations derived analytically to suit the unique structure of the present invention. Thus, the third and fourth harmonic inhibiting chokes are selected to be of a characteristic impedance proportional to the sum of the reactive impedances of the reactive device at the source and output signal frequencies. The fourth transmission line is selected to be of a length inversely proportional to the source signal frequency and of characteristic impedance proportional to the difference of the characteristic impedance of the third and fourth harmonic inhibiting chokes and the reactive impedance of the reactance device at the source signal frequency. By proportioning the members of the apparatus as described, the total inductive reactance of the third and fourth harmonic inhibiting chokes is less than the capacitive reactance of the device at the source frequency and greater than the capacitive reactance of the device at the output frequency. The sum of these reactances is therefore capacitive at the source frequency and inductive at the output frequency. The reactive impedance of the fourth transmission line at the source and output frequencies is opposite to the aforementioned sum thereby countervailing the reactive impedance of the active device.

Thus, by the practice of this invention, matching of the reactive impedance of the reactance device is accomplished simultaneously at the input and output signal frequencies, at the device terminals, eliminating large standing waves internal to the apparatus and the need for external tuners and filters.

These and further features and objects of the invention, its nature and various advantages, will be readily apparent upon consideration of the attached drawing and of the following detailed description of the drawing in which:

FIG. 1 is a low frequency lumped parameter circuit illustrating the mode of operation of the microwave structure of the invention, especially as shown in FIG. 2; and FIG. 2 is a side view, mainly in longitudinal section, of a microwave frequency doubler circuit.

Like reference characters are utilized throughout the drawing to designate like parts.

The circuit of FIG. 1 is included herein to illustrate, by analogy, the mode of operation of the present invention embodied in FIG. 2. A signal of frequency $f_1$ applied at input terminals 19 of FIG. 1 is conveyed via network 10, a short circuit at $f_1$, to junction 21. The components of network 11 are selected to present an open circuit at the source frequency $f_1$ thereby preventing the source signal appearing at output terminals 20. The source signal is transmitted by networks 12, 13 and 14 to a variable reactance device 15, e.g., a voltage sensitive capacitor, self biased by resistor 16. Device 15, in a well-known manner, when excited by the source signal of frequency $f_1$ will generate harmonics thereof. The components of networks 12 and 13 prevent the transmission of the third, $f_3$, and fourth, $f_4$, harmonics of the signal frequency $f_1$, respectively, from appearing at junction 21 thereby precluding the appearance of these harmonics at the input and output terminals. The second harmonic frequency, $f_2$, is transmitted by networks 12, 13 and 14 to junction 21. The components of network 10, selected to present an open circuit at a frequency of $f_2$, prevent a signal of this frequency from appearing at the input terminals. Thus, losses induced by unwanted signal components circulating in the source and load circuits, not shown, are greatly reduced. The inhibition of the third and fourth harmonic signals also inhibits the propagation of higher order harmonics. For the efficient conversion of energy, it is necessary that the reactive component of the impedance of device 15 be countervailed at both the source signal frequency $f_1$ and output signal frequency $f_2$. This matching of the reactive impedance of device 15, simultaneously at two different frequencies, is accomplished, in the present invention, by the utilization of a microwave counterpart of network 14. By the practice of this invention the components of networks 12 and 13 are selected so that the inductive reactance of the two combined networks is less than the capacitive reactance of device 15 at the source frequency $f_1$ and greater than the capacitive reactance of device 15 at the output frequency $f_2$. The sum of the reactances of networks 12 and 13 and device 15 are therefore capacitive at the source frequency $f_1$ and inductive at the output frequency $f_2$. The components of network 14 are selected to present a reactive impedance at frequencies $f_1$ and $f_2$ opposite to that of the resultant reactance of networks 12 and 13 and device 15. The reactive impedance of device 15 is therefore matched, simultaneously at two diverse frequencies. It is now a relatively simple matter to match the resistive portion of the impedance of device 15 to the load and input circuits with ideal transformers of the proper turns ratio. By utilizing the concepts illustrated by the circuit of FIG. 1, the present invention makes possible a low-loss microwave doubler circuit which does not require bulky and expensive external tuning apparatus.

The microwave doubler circuit of FIG. 2 comprises coaxial transmission lines 17 and 18 joined by transverse coaxial transmission line 22. Connectors 19 and 20, of any well-known type, terminate, respectively, lines 17 and 18 to facilitate connection with source and load apparatus. The inner conductor 23 of coaxial line 17 is partially hollow and includes a conducting rod 10 which serves as a quarter wave choke. The length of rod 10 is one quarter the wavelength of the source signal frequency, $f_1$, applied at connector 19. The inner conductor 24 of coaxial line 18 is similarly partially hollow and contains a conducting rod 11, of the same length as rod 10, terminated at the inside wall of conductor 24. Both rods 10 and 11 are joined at junction 21 which is a continuation of the inner conductor 26 of coaxial line 22. The outer conductor of line 22 is joined transversely to the outer conductors of lines 17 and 18. Biasing resistor 16 is attached to junction 21 and the extended cylindrical cap 25. Inner conductor 26 is partially hollow and contains a conducting rod 13 of a length equal to a quarter wavelength of the fourth harmonic, $f_4$, of the source frequency $f_1$. Rod 13 is terminated at the inside wall of conductor 26 while the opposite extremity of the rod is equipped with spring contact "fingers," not shown, for making mechanical and electrical contact with variable reactance device 15, e.g., a microwave varactor diode. Conducting rod 12 positioned within the inner conductor 27 of coaxial transmission line 14 has similar contact "fingers," not shown, for making mechanical and electrical contact with the opposite end of device 15. Rod 12 is equal in length to a quarter wavelength of the third harmonic, $f_3$, of source frequency $f_1$ and is terminated at the inside wall of conductor 27. Coaxial line 14, coupled by device 15 to line 22, is terminated by a conducting cap 28 which also supports inner conductor 27. Dielectric rings, e.g., 29, are used to support the various conductors. Portions of the apparatus of FIG. 2 are threadably connected to facilitate assembly and the replacement of variable reactance device 15.

Turning now to a description of the electrical characteristics of the present invention embodied in FIG. 2, an applied microwave signal of frequency $f_1$ at connector 19 is propagated by coaxial line 17 to junction 21. The quarter wave choke 10, since it is open circuited, appears as a short at the frequency $f_1$. The choke 10 is effectively in series with coaxial line 17, therefore the signal path is continuous and the applied signal is propagated into coaxial lines 18 and 22. The quarter wave choke 11, since it is shorted, appears as an open circuit at the source frequency therefore opening the path of propagation into line 18 at the source frequency $f_1$. The signal therefore is propagated in line 22 wherein it excites device 15. Device 15, excited by the incident field, generates signals harmonically related to the frequency of the applied signal. Quarter wave choke 13, since it is shorted, appears as an open circuit at the fourth harmonic frequency, $f_4$, inhibiting the propagation of this generated signal. Quarter wave choke 12 similarly inhibits propagation of the third, $f_3$, harmonic of the source frequency. The second harmonic $f_2$ of the incident signal frequency is not inhibited and is propagated by coaxial line 22 to junction 21. At this frequency quarter wave choke 10 will appear as an open circuit preventing the propagation of the output second harmonic signal into the source, not shown. Accordingly, by the practice of this invention, an output signal is obtained whose frequency is double that of the source signal frequency.

However, as well known by those skilled in the art, without further improvements the invention described above would be an inefficient microwave frequency doubler. This follows from the fact that a mismatch of reactive impedances between device 15 and the source and load, respectively, causes high standing waves to be present within the T microwave circuit of lines 17, 18 and 22. Such high standing waves give rise to losses in the conductor walls and dielectric members. It has been found, however, that if the characteristic impedances of chokes 12 and 13 are properly selected, the sum of their reactances and the reactance of device 15 may be made capacitive at the source frequency and inductive at the output frequency. If coaxial transmission line 14 is then selected to be of a length and characteristic impedance such that equal and opposite reactances, respectively, to the sum of the reactances of chokes 12 and 13 and device 15 at the source and output frequencies, are provided, simultaneously, the reactive portion of device 15 will be matched to the source and load. Having countervailed the reactive impedance of device 15, it is a simple matter to match the resistive portion by the use of quarter wave transformers. With properly selected varactor diodes having a dynamic input resistance of the same value as the source resistance, these transformers need not be used.

By the practice of this invention, matching of the reactive impedance of diode 15 is accomplished at the diode terminals, eliminating large standing waves internal to the apparatus and the use of expensive and bulky tuners, by proportioning the members of the apparatus in accordance with the following analytical results:

$$Z_{01}=\frac{X_1+X_2}{3.75}$$

$$Z_{02}=\frac{Z_{01}-X_1}{1.72}$$

$$L=\frac{.1662}{f_1}$$

where $Z_{01}$ equals the characteristic impedance of the third and fourth harmonic chokes, 12 and 13, respectively, $X_1$ equals the reactive impedance of device 15 at the source frequency of $f_1$, $X_2$ equals the reactive impedance of device 15 at the output frequency of $f_2$, $Z_{02}$ equals the characteristic impedance of coaxial transmission line 14, and L equals the length of coaxial transmission line 14.

It is to be understood that the embodiment shown and described are illustrative and that further modifications of this invention may be implemented by those skilled in the art without departing from the scope and spirit of the invention. For example, sliding quarter wave tuners at the appropriate frequencies may be incorporated in lines 17 and 18 to match the resistive impedance of device 15 to the source and load. In addition, doubler circuits, as described in this specification, may be cascaded to provide factors of multiplication greater than two. Also, the relative positions of chokes 12 and 13 may be reversed, if so desired.

What is claimed is:

1. A microwave multiplier circuit comprising, in combination, a coaxial T circuit including means for inhibiting the propagation of a signal whose frequency is the fourth harmonic of a specified frequency; variable reactance means electrically coupled to said coaxial T circuit for generating signals of a harmonic frequency related to an applied signal of said specified frequency; coaxial means coupled to said reactance means, including means for inhibiting a signal whose frequency is the third harmonic of said specified frequency, of a length inversely proportional to said specified frequency and characteristic impedance proportional to the difference of the characteristic impedance of said third or fourth harmonic inhibiting means and the reactance of said variable reactance means at said specified frequency for simultaneously countervailing the reactance of said reactance means at said specified frequency and the second harmonic thereof.

2. A microwave multiplier circuit comprising, in combination, input and output means; a coaxial T circuit interconnecting said input and output means including means for inhibiting the propagation of a signal of specified frequency into said output means, said T circuit including means for inhibiting the propagation of a signal whose frequency is the second harmonic of said specified frequency into said input means, said T circuit including means for inhibiting the propagation of a signal whose frequency is the fourth harmonic of said specified frequency; variable reactance means electrically coupled to said coaxial T circuit for generating signals of harmonic frequencies related to an applied signal of said specified frequency; coaxial means coupled to said reactance means including means for inhibiting a signal whose frequency is the third harmonic of said specified frequency and of a length inversely proportional to said specified frequency and characteristic impedance proportional to the difference of the characteristic impedance of said third or fourth harmonic inhibiting means and the reactance of said variable reactance means at said specified frequency for simultaneously countervailing the reactance of said reactance means at said specified frequency and the second harmonic thereof.

3. A microwave circuit comprising, in combination, a source of microwave signals of specified frequency; first coaxial means coupled to said source; second coaxial means; third coaxial means connected transversely to said first coaxial and said second coaxial means including means for inhibiting the propagation of a signal whose frequency is the fourth harmonic of said specified frequency; variable reactance means electrically connected to said fourth harmonic inhibiting means; and fourth coaxial means including means for inhibiting the propagation of a signal whose frequency is the third harmonic of said specified frequency coupled to said third coaxial means by said variable reactance device and of a length and characteristic impedance to compensate simultaneously for the reactance of said device at said specified frequency and the second harmonic thereof.

4. A microwave circuit comprising, in combination, a source of microwave signals of specified frequency; first coaxial means coupled to said source including means for inhibiting the propagation of a signal whose frequency is the second harmonic of said specified frequency; second coaxial means including means for inhibiting the propagation of said specified frequency; third coaxial means connected transversely to said first coaxial and said second coaxial means including means for inhibiting the propagation of a signal whose frequency is the fourth harmonic of said specified frequency; variable reactance means electrically connected to said fourth harmonic inhibiting means; and fourth coaxial means including means for inhibiting the propagation of a signal whose frequency is the third harmonic of said specified frequency coupled to said third coaxial means by said variable reactance device and of a length and characteristic impedance to compensate simultaneously for the reactance of said device at said specified frequency and the second harmonic thereof.

5. A mircrowave frequency doubler circuit comprising a first coaxial transmission line; a second coaxial transmission line; junction means for connecting said first and said second transmission lines; a third coaxial transmission line transversely connected to said first and said second lines at said junction means; a source of electrical signals of specified frequency connected to said first line; variable capacitor means positioned in said third line responsive to said source signals for generating signals of a frequency harmonically related to said specified frequency, said third line comprising first means for inhibiting the propagation of a signal whose frequency is quadruple said specified frequency; a fourth coaxial transmission line comprising second means for inhibiting the propagation of a signal whose frequency is triple said specified frequency, said fourth line coupled to said third line by said variable capacitor and proportioned to countervail simultaneously the reactive impedance of said variable capacitor at said specified frequency and at the second harmonic thereof.

6. A microwave frequency doubler circuit comprising a first coaxial transmission line; a source of signals of specified frequency, $f_1$, connected to said first line; a second coaxial transmission line; a third coaxial transmission line joining said first and said second lines; a variable reactance device of reactance $X_1$ at a frequency of $f_1$ and $X_2$ at the second harmonic frequency of $f_1$; a short circuited choke of a length corresponding to a quarter wavelength of the fourth harmonic, $f_4$, of said specified frequency, $f_1$, of characteristic imperance, $Z_{01}$, proportional to the sum of said reactances $X_1$ and $X_2$ positioned within the inner conductor of said third coaxial transmission line in series circuit relation with said variable reactance device; a fourth shorted coaxial transmission line of a length inversely proportional to the frequency, $f_1$, and characteristic impedance, $Z_{02}$, proportional to the difference of $Z_{01}$ and $X_1$ connected to said third transmission line; and a short circuited choke of a length corresponding to a quarter wavelength of the third harmonic, $f_3$, of said specified frequency, $f_1$, of characteristic impedance $Z_{01}$ positioned within the inner conductor of said fourth coaxial transmission line and in series circuit relation with said variable reactance device.

7. A mircowave frequency doubler circuit comprising a first coaxial transmission line; a source of mircowave signals of specified frequency, $f_1$, coupled to said first coaxial transmission line; a second coaxial transmission line; a third coaxial transmission line transversely joining said first and said second lines; a short circuited choke of a length corresponding to a quarter wavelength of the fourth harmonic, $f_4$, of said specified frequency, $f_1$, of characteristic impedance $$Z_{01}=\frac{X_1+X_2}{3.75}$$

positioned within the inner conductor of said third coaxial transmission line; a variable reactance device of reactance $X_1$ at said frequency $f_1$ and $X_2$ at the second harmonic frequency of $f_1$, in series circuit relation with said fourth harmonic choke; a fourth shorted coaxial transmission line of a length inversely proportional to the frequency, $f_1$, and characteristic impedance $$Z_{02}=\frac{Z_{01}-X_1}{1.72}$$

connected to said third transmission line; and a short circuited choke of a length corresponding to a quarter wavelength of the third harmonic, $f_3$, of said specified frequency, $f_1$, of characteristic impedance $Z_{01}$ positioned within the inner conductor of said fourth coaxial transmission line and in series circuit relation with said variable reactance device.

8. A microwave frequency doubler circuit comprising a first coaxial transmission line; an open circuited choke of a length corresponding to a quarter wavelength of a first specified frequency, $f_1$, positioned within the inner conductor of said first coaxial transmission line; a second coaxial transmission line; a short circuited choke of a length corresponding to a quarter wavelength of said specified frequency, $f_1$, positioned within the inner conductor of said second coaxial transmission line; a third coaxial transmission line joining said first and said second lines; a short circuited choke of a length corresponding to a quarter wavelength of the fourth harmonic, $f_4$, of said specified frequency, $f_1$, of characteristic impedance $$Z_{01}=\frac{X_1+X_2}{3.75}$$

positioned within the inner conductor of said third coaxial transmission line; a variable reactance device of reactance $X_1$ at said frequency $f_1$ and $X_2$ at the second harmonic frequency of $f_1$, in series circuit relation with said fourth harmonic choke; a fourth shorted coaxial transmission line of a length inversely proportional to the frequency, $f_1$, and characteristic impedance $$Z_{02}=\frac{Z_{01}-X_1}{1.72}$$

connected to said third transmission line; and a short circuited choke of a length corresponding to a quarter wavelength of the third harmonic, $f_3$, of said specified frequency, $f_1$, of characteristic impedance $Z_{01}$ positioned within the inner conductor of said fourth coaxial transmission line and in series circuit relation with said variable reactance device.

9. A mircowave multiplier circuit comprising, in combination, a coaxial T circuit including means for inhibiting the propagation of a signal whose frequency is the third harmonic of said specified frequency; variable reactance means electrically coupled to said coaxial T circuit for generating signals of a harmonic frequency related to an applied signal of said specified frequency; coaxial means coupled to said reactance means, including means for inhibiting a signal whose frequency is the fourth harmonic of said specified frequency, of a length inversely proportional to said specified frequency and characteristic impedance proportional to the difference of the characteristic impedance of said third or fourth harmonic inhibiting means and the reactance of said variable reactance means at said specified frequency for simultaneously countervailing the reactance of said reactance means at said specified frequency and the second harmonic thereof.

References Cited

UNITED STATES PATENTS

| | | | |
|---|---|---|---|
| 2,408,420 | 10/1946 | Ginzton | 321—69 |
| 2,727,986 | 12/1955 | Pascalar | 325—446 |
| 3,155,914 | 11/1964 | Vice et al. | 330—4.9 |
| 3,267,352 | 8/1966 | Blight | 321—69 |
| 3,287,621 | 11/1966 | Weaver | 321—69 |
| 3,328,670 | 6/1967 | Parker | 321—69 |

JOHN E. COUCH, *Primary Examiner.*

G. GOLDBERG, *Assistant Examiner.*